US011365761B2

(12) United States Patent
Engelen et al.

(10) Patent No.: US 11,365,761 B2
(45) Date of Patent: Jun. 21, 2022

(54) BEARING UNIT WITH RETAINING CAGE

(71) Applicant: Aktiebolaget SKF, Gothenburg (SE)

(72) Inventors: Philip Engelen, Utrecht (NL); Marco Gemello, Nichelino (IT); Francesco Lamboglia, Pinerolo (IT); Giorgio Missiaggia, Trieste (IT)

(73) Assignee: Aktiebolaget SKF

( * ) Notice: Subject to any disclaimer, the term of this patent is extended or adjusted under 35 U.S.C. 154(b) by 0 days.

(21) Appl. No.: 16/983,067

(22) Filed: Aug. 3, 2020

(65) Prior Publication Data
US 2021/0033147 A1    Feb. 4, 2021

(30) Foreign Application Priority Data
Aug. 2, 2019   (IT) .................. 102019000013689

(51) Int. Cl.
*F16C 19/18*    (2006.01)
*F16C 33/38*    (2006.01)

(52) U.S. Cl.
CPC ...... *F16C 33/3843* (2013.01); *F16C 33/3887* (2013.01); *F16C 19/186* (2013.01); *F16C 2326/02* (2013.01)

(58) Field of Classification Search
CPC ........ F16C 19/14; F16C 19/16; F16C 19/163; F16C 19/182–187; F16C 33/3843; F16C 33/385; F16C 33/3856; F16C 33/3887; F16C 2326/02; B60B 27/0005
See application file for complete search history.

(56) References Cited

U.S. PATENT DOCUMENTS

| | | | |
|---|---|---|---|
| 4,133,588 A | 1/1979 | Earsley | |
| 2009/0028483 A1* | 1/2009 | Kawaguchi | F16C 33/6674 384/475 |
| 2010/0183256 A1* | 7/2010 | Kimura | F16C 33/3843 384/523 |
| 2019/0128326 A1* | 5/2019 | Watanabe | F16C 33/3856 |
| 2020/0132119 A1 | 4/2020 | Engelen et al. | |

FOREIGN PATENT DOCUMENTS

| | | |
|---|---|---|
| DE | 102008059571 | 6/2010 |
| DE | 102015215460 | 2/2017 |
| EP | 3040565 | 7/2016 |
| FR | 3015600 | 6/2015 |
| GB | 2132287 | 7/1984 |
| JP | 2003004047 | 1/2003 |

OTHER PUBLICATIONS

International Search Report for corresponding Italian Patent Application No. 102019000013689 dated Apr. 3, 2020.

* cited by examiner

*Primary Examiner* — Alan B Waits
(74) *Attorney, Agent, or Firm* — Reed Smith LLP

(57) ABSTRACT

Bearing unit provided with at least one ring of rolling bodies and, for retaining the rolling bodies, at least one retaining cage which has a cage bar, a plurality of circumferentially spaced cage arms that extend from one side of the cage bar, and a plurality of partially spherical cavities for retaining the rolling bodies; contact points between the rolling bodies and the cage being positioned in the vicinity of a polar region of each rolling body. The minimum number of contact surfaces for containing the rolling bodies in the direction of rotation of the bearing and ensuring contact only in the polar region is equal to two for each rolling body, namely one upper contact surface and one lower contact surface.

16 Claims, 7 Drawing Sheets

Fig. 2 – Prior Art

BEARING UNIT WITH RETAINING CAGE

CROSS REFERENCE TO RELATED APPLICATION

This application is based on and claims priority under 35 U.S.C. § 119 to Italian Application No. 102019000013689, filed Aug. 2, 2019, the entire contents of which are incorporated herein by reference.

FIELD

Exemplary embodiments of the disclosure relate to a bearing unit provided with a retaining cage.

BACKGROUND

A known cage for rolling bodies, particularly balls, of a bearing unit is formed by a circular cage bar and a plurality of circumferentially spaced cage arms which extend from one side of the bar. The cage bar and the cage arms have partially spherical concave surfaces, jointly defining a plurality of partially spherical pockets or cavities for retaining corresponding balls.

The cage bar is a continuous structural element which extends circumferentially along the cage and forms a solid base so as to impart the necessary rigidity to the cage as a whole to retain the balls of each ring at equal circumferential spacings along the races of a bearing.

Document DE102008059571A1 shows the design of a cage in which a compartment wall forms an optimized support surface for the equatorial region of the ball.

Document JP2003004047(A) shows the contact area between the cage and the balls is reduced by forming on the cage a plurality of protrusions in contact with the balls.

Document U.S. Pat. No. 4,133,588A, shows the inner surface of the cage is provided with projections of different configurations which define engagement surfaces for the ball and which have an effective diameter slightly larger than that of the balls, to provide a minimum clearance with the balls.

BRIEF DESCRIPTION OF THE DRAWINGS

The exemplary embodiments will now be described with reference to the attached drawings, which show some non-limiting examples of its embodiment, in which.

DETAILED DESCRIPTION

Figure 1:
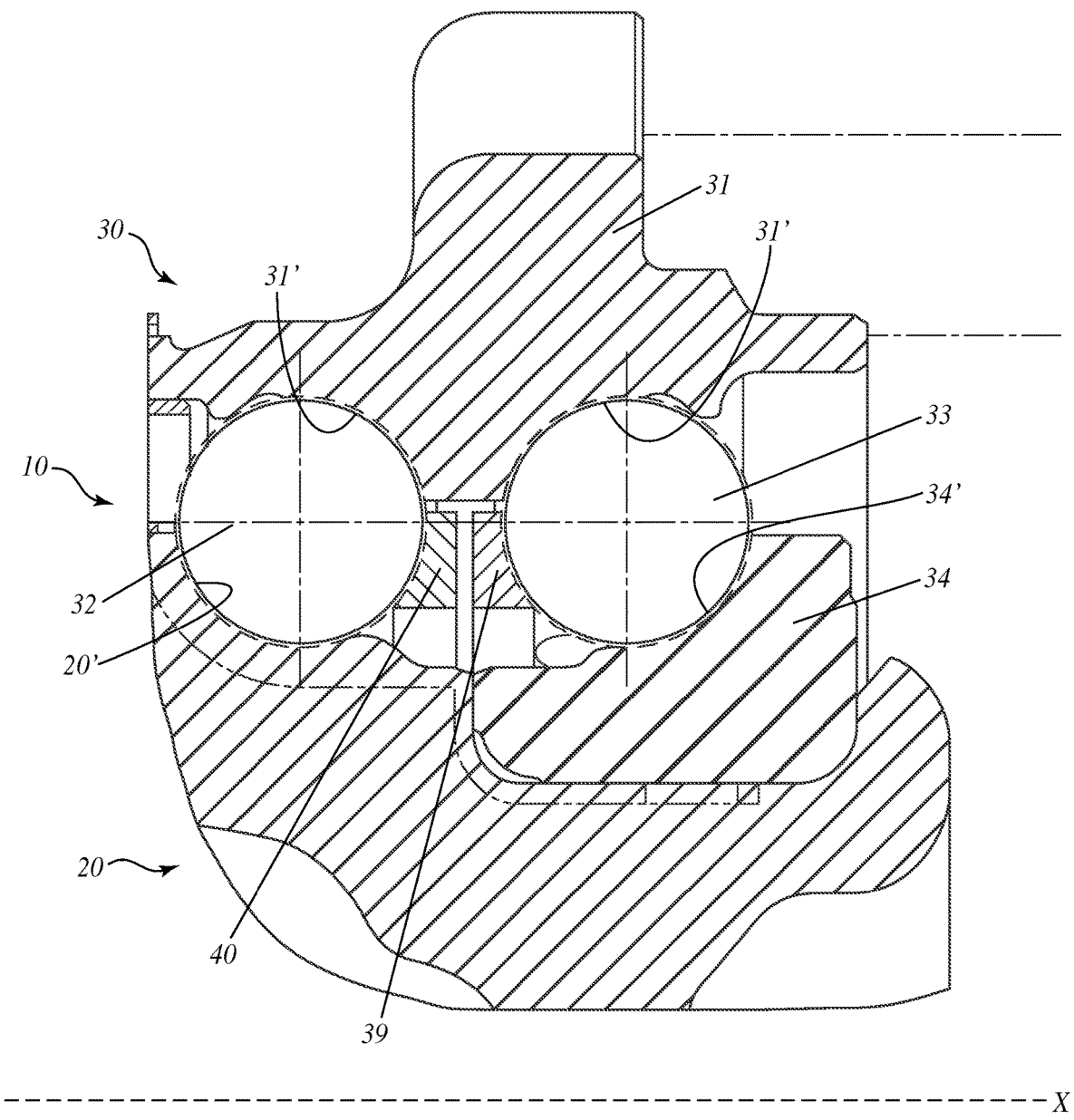
FIG. 1 is a partial cross section of a bearing unit provided with two cages for containing and retaining balls.

In known cages for rolling bodies, the contact occurring between the ball and the cage usually takes place in the equatorial region of the ball, which comes into contact with suitable projections formed on the cage. As a result of the rolling motion of the balls with respect to the races of the inner and outer rings of the bearing unit, the relative motion between ball and cage is practically a sliding motion, that is to say a translational motion of the equatorial region of the ball with respect to the projections of the cage. The contact surface between the two components which is formed at the equatorial region of the ball is the maximum surface that is geometrically feasible. Additionally, the tangential velocities of the contact points of the ball are also at a maximum, since these points are at the maximum distance (practically equal to the radius of the ball) from the axis of rotation of the ball. Consequently a sliding motion of this kind gives rise to the appearance of a very high level of sliding friction, which is theoretically the maximum that can be reached. High sliding friction between the cage and the ball evidently results in greater energy dissipation in the form of heat flow.

In known cages for rolling bodies, if any contact is provided between the cage and ball in the equatorial region of the ball, the relative tangential velocities are high, as is the resulting energy dissipation.

Exemplary embodiments disclosed herein provide a cage configured so that the contact points between balls and cage are reduced and are displaced towards the polar region of the ball, thus reducing the relative sliding velocities of the points of contact of the ball with the cage, and consequently the sliding friction. Exemplary embodiments prevent contact between adjacent balls fitted in the cage in the operating conditions of the bearing unit, such contact causing noise which is unacceptable to end users, and evidently also causing greater wear on the rolling bodies themselves.

Exemplary embodiments provide a bearing unit cage for rolling bodies (particularly balls) which reduces the sliding friction force that appears between the cage and the rolling bodies, and therefore reduces the dissipated heat flow, while still preventing contact between the rolling bodies.

The retaining cage has a "stepped" shape and is suitable for bearing units, especially rolling bearings. The exemplary embodiments are particularly, although not exclusively, suitable for wheel hub assemblies of motor vehicles, where the assemblies are provided with a bearing unit. These applications comprise both the case in which the outer ring of the bearing unit is rotating while the inner ring of the bearing unit is fixed and the opposite case in which the inner ring rotates and the outer ring is fixed. Exemplary embodiments are advantageously, but not exclusively, applicable to a bearing unit having a double ring of balls.

Exemplary embodiments reduce the friction between rolling bodies, for example balls, and cages for bearing units of wheel hub assemblies by reducing and displacing the contact points between balls and cages, and particularly by displacing the point of contact towards the polar region of the ball, thus reducing the relative sliding velocities of the points of contact of the ball with the cage, and consequently the sliding friction.

According to exemplary embodiments, concerning the contact area between ball and cage, which could theoretically coincide with the poles of the ball, in order for this contact area to be functionally effective to ensure the retention of the balls and capable of being produced industrially the aforesaid contact area must be limited to within a predetermined range, which may be defined, for example, as the range in which some dimensional parameters of the contact surfaces vary in the radial and axial directions relative to the centre of the ball or of any generic rolling body.

The contact surfaces formed on the cage must also have a correctly optimized geometry in order to have a contact surface that is as limited as possible but still retains the balls effectively, prevents any contact between the balls while keeping the distance between adjacent balls to a minimum, and can be produced industrially.

According to exemplary embodiments, the overall design of the cage is optimized in the shape of the cage arms, in such a way that the moulding of the cage is feasible and financially sustainable.

According to exemplary embodiments, therefore, a description is given of an innovative cage for rolling bodies of a bearing unit, of a wheel hub assembly for example, having the characteristics stated in the independent claim appended to the present description.

Purely by way of example and without limiting intent, the exemplary embodiments will now be described with reference to a wheel hub assembly for motor vehicles provided with a rolling bearing.

With reference to FIG. 1, a wheel hub assembly according to a preferred embodiment of the invention is indicated as a whole by 10. The figure shows a detail of the example of the configuration.

The assembly 10 has a central axis of rotation X, and comprises a hub 20, which is preferably but not necessarily stationary, and a bearing unit 30, which in turn comprises a radially outer ring 31 which is preferably but not necessarily rotatable, a radially inner ring 20 defined by the hub 20, a further stationary radially inner ring 34 mounted on, and fixed to, the hub 20; two rings of rolling bodies 32, 33, in this example balls, interposed between the radially outer ring 31 and the radially inner ring 20 and 34; and two cages 39 and 40 for keeping the rolling bodies of the rings of rolling bodies 32, 33 in position.

Throughout the present description and the claims, terms and expressions indicating positions and orientations such as "radial" and "axial" are to be interpreted as relating to the central axis of rotation X of the bearing unit 30, unless specified otherwise. On the other hand, expressions such as "axially outer" and "axially inner" relate to the assembled condition of the wheel hub assembly, and in the present case preferably relate to a wheel side and to a side opposite the wheel side, respectively.

The radially outer ring 31 is provided with two respective radially outer races 31', while the radially inner rings 20, 34 are provided with respective radially inner races 20', 34' to allow the rolling of the axially outer ring of rolling bodies 32 interposed between the radially outer ring 31 and the hub 20, and of the ring of axially inner rolling bodies 33 between the radially outer ring 31 and the radially inner ring 34. For simplicity of illustration, the references 32, 33 will be applied both to the individual balls and to the rings of balls. Also for simplicity, the term "ball" may be used by way of example in the present description and in the attached drawings in place of the more generic term "rolling body" (and the same reference numerals will also be used).

To simplify the following discussion and to emphasize even more clearly the degree to which the cages 39 and 40 are innovative, reference will now be made to FIG. 2, which shows a cage 1 made according to the prior art and comprising a circular cage bar 2 and a plurality of circumferentially spaced cage arms 3, which extend on one side of the bar 2. The cage bar 2 and the cage arms 3 have partially spherical concave surfaces, jointly defining a plurality of partially spherical pockets 4 or cavities for retaining corresponding balls by means of contact areas 5.

Figure 3:
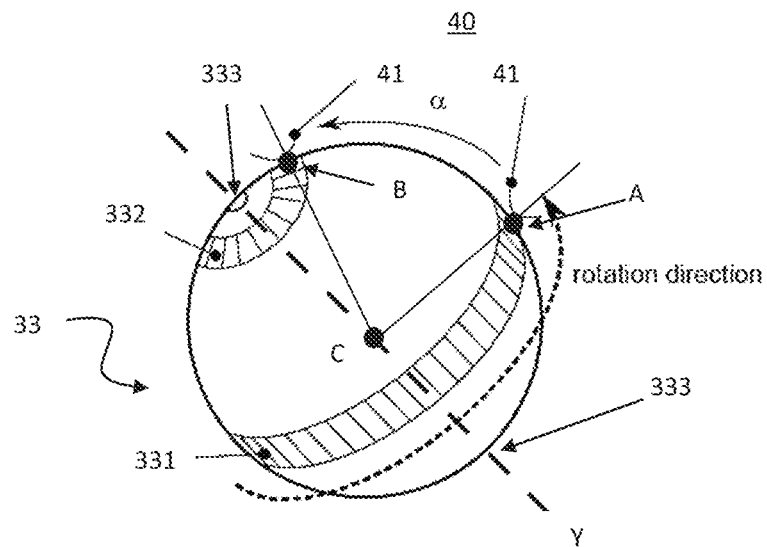
FIG. 3 is an axonometric view of a ball for a bearing unit, showing the contact points with a retaining cage, according to the prior art (equatorial region) and according to the present invention (polar region)

FIG. 3 schematically shows a ball 33 for a bearing unit, for example the bearing unit 30 of FIG. 1. The ball 33, like all the balls 33 of the bearing unit 30, rolls, as a result of the relative rotary motion between the inner ring and the outer ring of the bearing unit 30, and therefore between the respective races, about its own axis of rotation Y in the direction indicated in broken lines in FIG. 3 as the "rotation direction".

Figure 2:
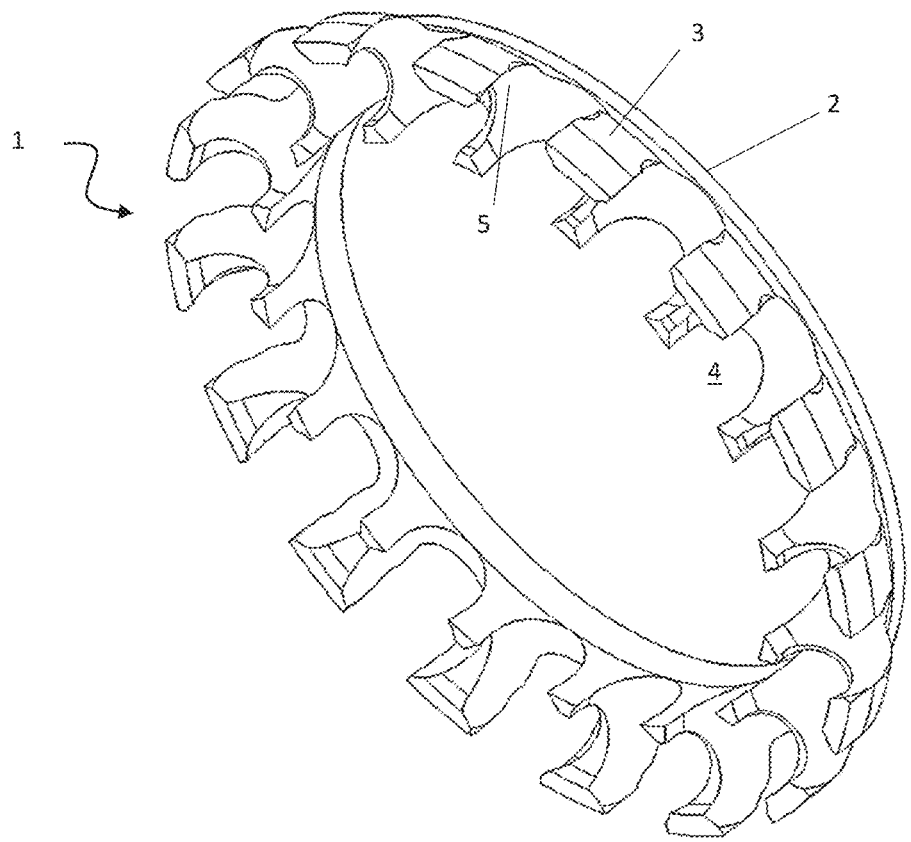
FIG. 2 is an axonometric view of the cage for rolling bodies according to the prior art.

If the ball 33 is positioned in a cage 1 as shown in FIG. 2, that is to say in a cage according to the prior art, the ball 33 comes into contact with the cage 1 at contact points 41 positioned along an equatorial region 331 located around the axis Y and perpendicular to this axis Y. Conversely, when the ball 33, like all the balls 33 of the bearing unit 30, is positioned in a retaining cage 39, 40 (not shown in the figure) according to the present invention, the ball 33 comes into contact with the cage 39, 40 at contact surfaces 41 positioned along a polar region 332 located around the axis Y parallel to the equatorial region 331, but near a pole 333 of the ball 33.

In fact, as has been said, the idea underlying the exemplary embodiments is that of reducing the sliding friction between the cage and the ball by positioning the theoretical contact points (which are actually contact surfaces 41) in the polar region 332 of the ball 33, that is to say in the proximity of the poles 333 of the ball 33.

To understand the potential of the solution, it is possible to define an angle $\alpha$ subtended by a half-line CA originating in the center C of the ball 33, passing through a point A on the outer surface of the ball and belonging to the equatorial region 331, and by a half-line CB originating in the center C of the ball 33, passing through a point B on the outer surface of the ball and belonging to the polar region 332. In other words, the angle $\alpha$ represents an angular distance a of the contact surfaces 41 from an equator of the rolling bodies 32, 33.

In exemplary embodiments, the relative tangential sliding velocity between cage and ball is reduced by a factor corresponding to the cosine of the angle $\alpha$ as defined above. The consequent sliding friction between ball and cage is reduced in the same proportion.

To obtain the maximum benefit in the friction reduction while also ensuring the ball retention performance, the cage 40 has certain specific characteristics.

Firstly, the contact point between ball and cage is as near as possible to one of the two poles 333 of the ball. To meet production requirements, such contact points must actually be contact surfaces. However, in order to be capable of absorbing the forces in the direction of rotation of the bearing and maintain the distance between each ball during operation, the contact surfaces 41 and the consequent polar regions 332 is positioned below the poles 333.

Figure 4:
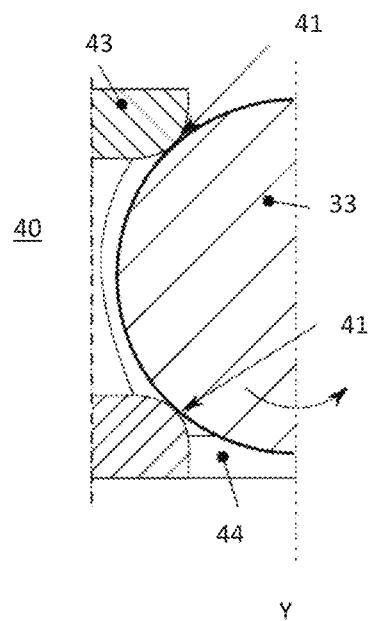
FIG. 4 shows in a partial cross section the details of the contact points between cage and ball.
Figure 5:
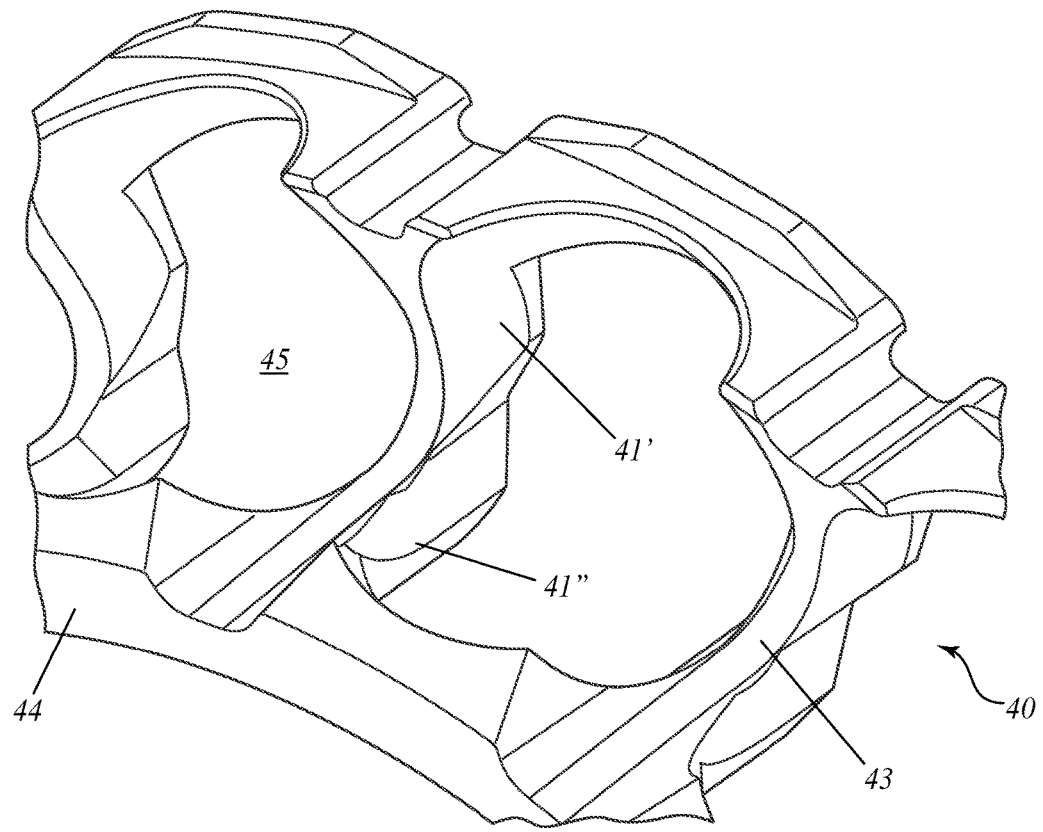
FIG. 5 is a detail of the pocket of the cage according to the present invention, showing the contact surfaces between ball and cage.

With reference to FIGS. 4 and 5, the contact surfaces 41 are reduced to the minimum to ensure that contact takes place only in the polar regions 332 as defined above. The minimum number of contact surfaces 41 for containing the ball in the direction of rotation of the bearing and ensuring contact only in the polar region is equal to two for each ball, namely one on each hemisphere of the pocket 45, as shown in FIG. 5, that is to say an upper contact surface 41' and a lower contact surface 41".

Advantageously, the contact surfaces 41 are symmetrical with respect to the equatorial plane of the ball.

Figure 6A:
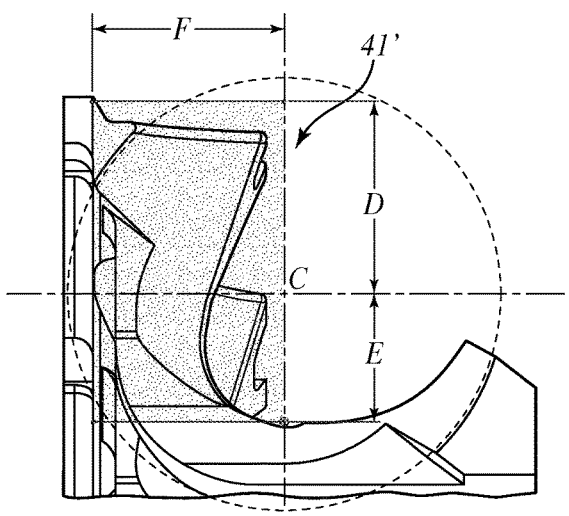
FIG. 6 shows the upper contact surface (FIG. 6a) and the lower contact surface (FIG. 6b) with the characteristic parameters for the corresponding design.

With reference to FIG. 6a, the upper contact surface 41' may be described by the dimensional parameters D, E, and F. The parameters may be related to the center C of the respective rolling body 32, 33 and to its diameter Dw and represent, respectively, the distance from the center C in the outward radial direction D, in the inward radial direction E and in the axial direction F. It should be noted that, in this case (as also for the design of the lower contact surface, as will be described subsequently), the expressions "outward radial direction" and "inward radial direction" refer to the center C of the generic rolling body, and not to the axis X of the bearing unit. Therefore the extension of the upper contact surface 41' may be defined thus:

in the outward radial direction the parameter D must be ≤0.5×the diameter Dw of the rolling body;

in the inward radial direction the parameter E must be ≤0.3×the diameter Dw of the rolling body;

in the axial direction the parameter F must be ≤0.5×the diameter Dw of the rolling body.

Figure 6B:
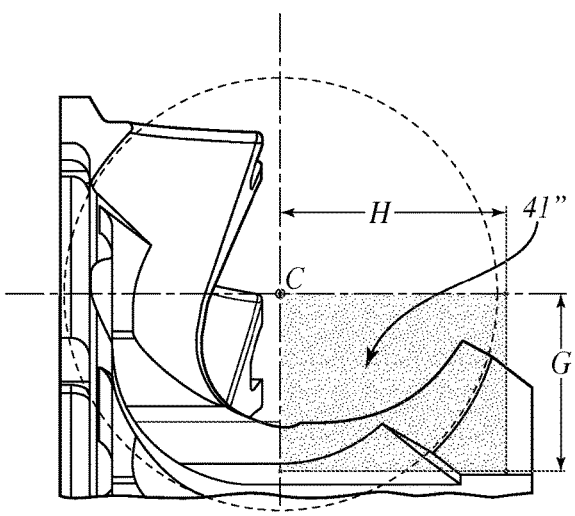

With reference to FIG. 6b, the lower contact surface 41" may be described by the dimensional parameters G and H. These parameters may be related to the center C of the respective rolling body 32, 33 and to its diameter Dw and represent, respectively, the distance from the center C in the inward radial direction G and in the axial direction H. Therefore the extension of the lower contact surface 41" may be defined thus:

in the inward radial direction the parameter G must be ≤0.41×the diameter Dw of the rolling body;

in the axial direction the parameter H must be ≤0.52×the diameter Dw of the rolling body.

Figure 7:
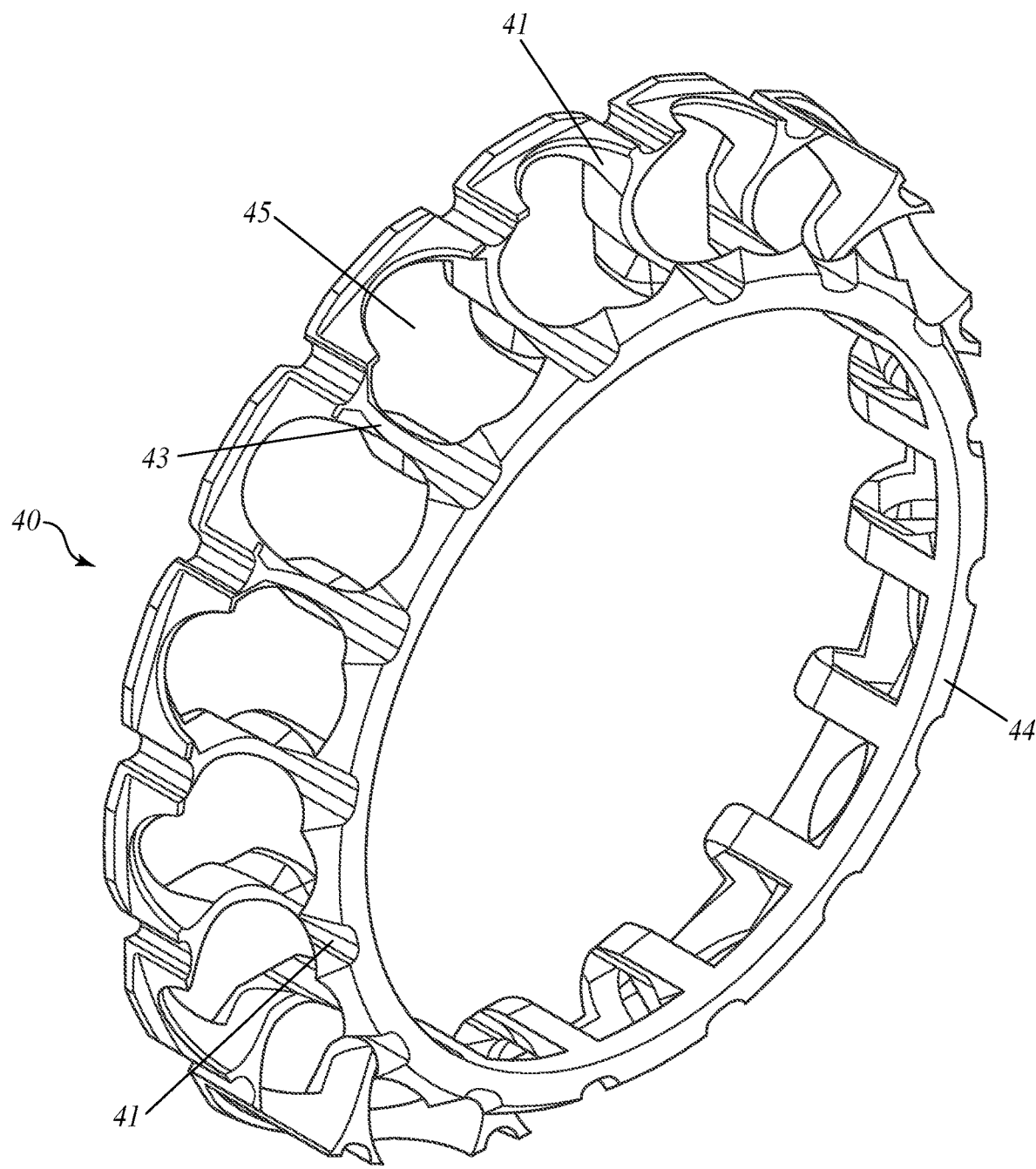
FIG. 7 is an axonometric view of a cage for rolling bodies according to an aspect of the present invention.

FIG. 7 shows, in a three-dimensional view, the whole cage 40 according to an exemplary embodiment. The cage comprises a cage bar 44 and a plurality of circumferentially spaced cage arms 43, which extend from one side of the bar. The cage bar 44 and the cage arms 43 have partially spherical concave surfaces, jointly defining a plurality of partially spherical pockets or cavities 45 for retaining corresponding balls by means of the contact surfaces 41.

To contain the maximum number of balls, the material of the cage is removed around the minimum distance between two adjacent balls, and the geometry of the cage arms 43 will therefore be C-shaped.

To connect the cage arms 43 of the cage 40, a cage bar 44 positioned in a circumferential direction will be used. For ease of manufacture and for considerations of weight, the cage bar is positioned on the inner circumference of the cage, as shown in FIG. 6. Advantageously, to meet the requirements for structural robustness, the cage is also provided with an external cage bar.

The subsequent figures, which are details of the preceding FIG. 6, show examples of the cage according to the exemplary embodiments.

Figure 8:
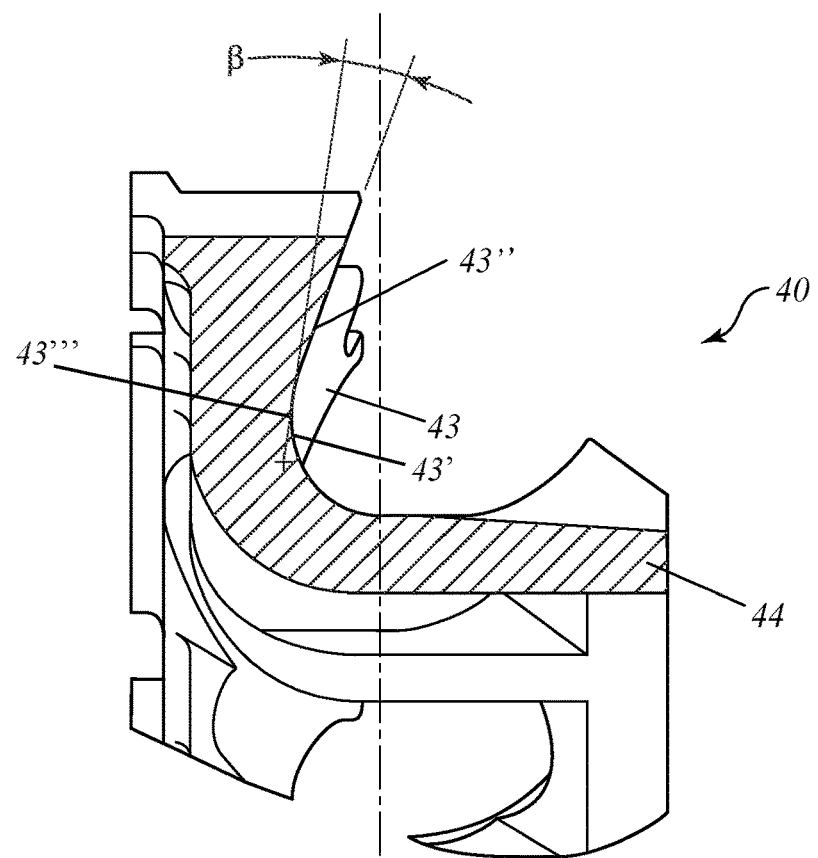
FIG. 8 is a front view of a detail of the cage of FIG. 7 and of its cage bar.

FIG. 8 shows an important arrangement that is useful for preventing contact between adjacent balls. The material interposed between adjacent balls, that is to say the material forming the cage arms, is incremented by means of a surface 43" inclined at an angle β. The value of this angle is advantageously in the range from 10° to 20°. As shown in FIG. 8, each of the cage arms 43 comprises a first surface 43' extending from the cage bar 44, and surface 43" which comprises a second surface 43" extending from a junction 43''' between first surface 43' and second surface 43" distally from the cage bar 44, wherein second surface 43" is inclined toward the cage bar 44 by an angle (β) whose value is between 10° and 20° with respect to a line tangent to the junction 43'''.

Figure 9:
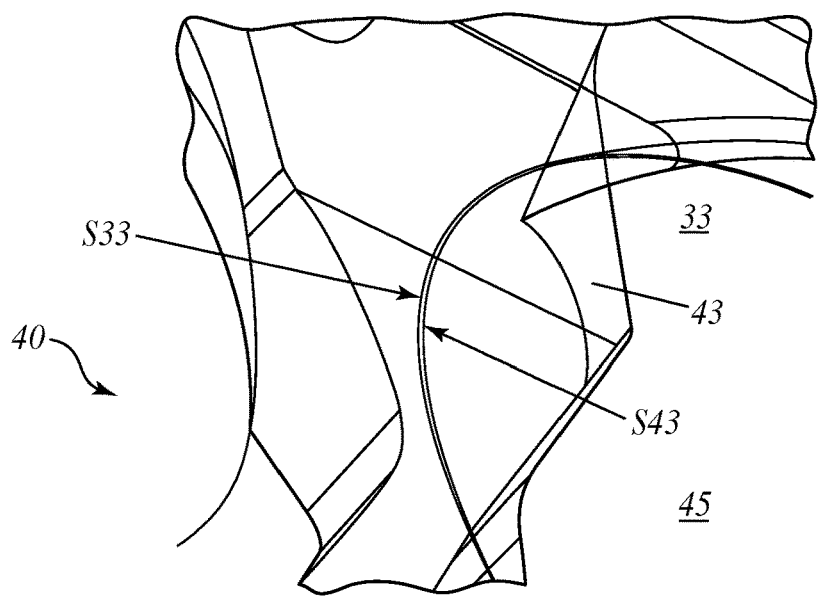
FIG. 9 is a first detail of a pocket of the cage of FIG. 7, showing the intersection volume between the outer surface of the ball and the inner surface of the cage arms.

FIG. 9 shows a detail of the cage which highlights the intersection volume between the outer surface S33 of the ball 33 and the inner surface S43 of the cage arms 43. To ensure the retention of the ball while also preventing contact between adjacent balls, a minimum interference, in other words a minimum intersection volume between ball and cage, is necessary. The minimum intersection volume is present in the hypothetical situation in which the balls come into contact. Therefore the intersection volume prevents contact between the balls. However, the volume of this intersection pattern must be as small as possible, preferably in the range from 0.5 mm³ to 1 mm³.

Figure 10:
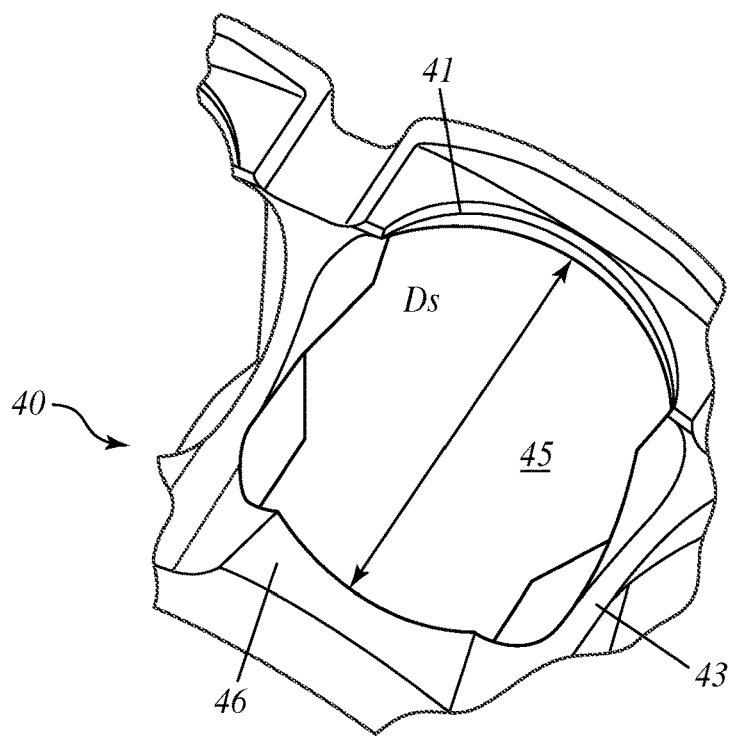
FIG. 10 is a second detail of the pocket of the cage of FIG. 7, showing the design of the spherical surface of the cage.

With reference to FIG. 10, the diameter Ds of the spherical surface 46 inscribed in the surface portions that form the contact surfaces 41—in practice the relevant diameter of the pocket (otherwise known as the cavity) 45—will be greater than the diameter Dw of the corresponding ball 33 fitted into the pocket 45, thereby providing a clearance varying from 0.1 mm to 0.5 mm.

Figure 11:
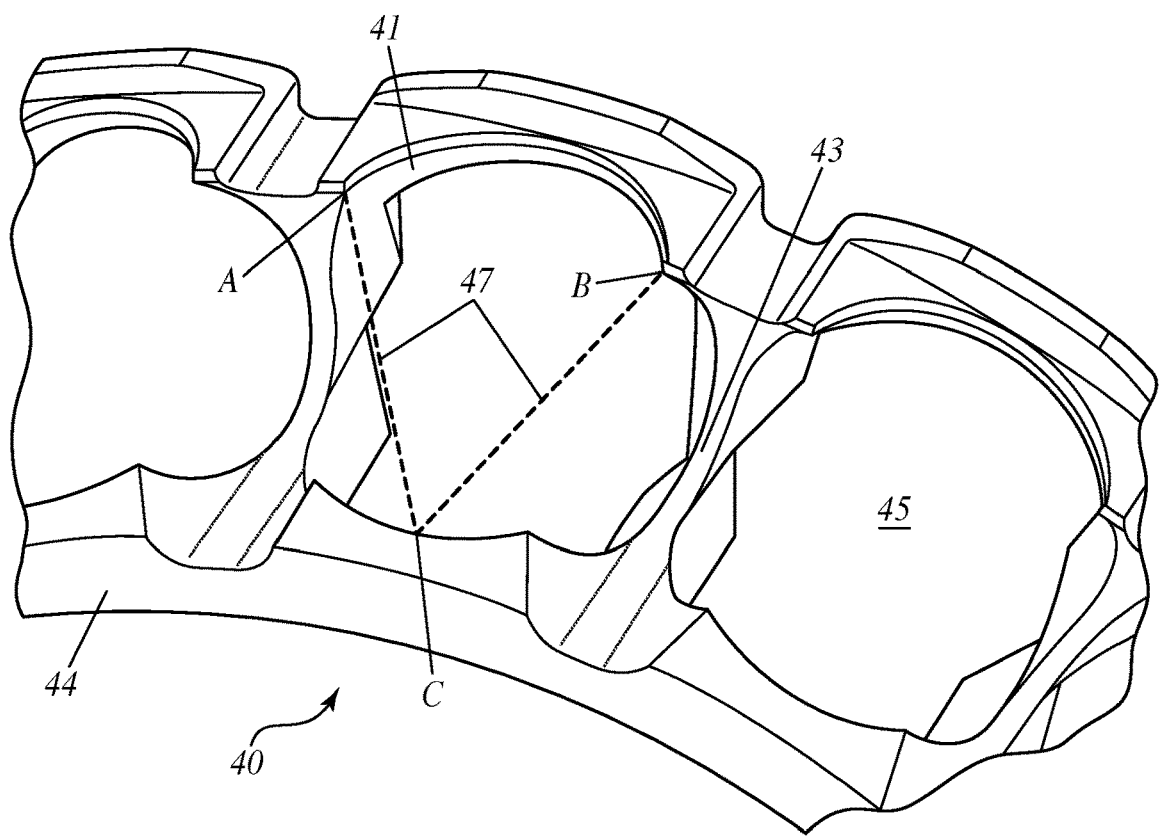
FIG. 11 is a third detail of the pocket of the cage of FIG. 7, showing the design of the minimum edges for entry of a ball into the pocket.

Finally, with reference to FIG. 11, the pocket 45 has two chords 47, defined by the distances between points A and C and points B and C respectively, which form the entry edges at the lower end, used for retaining the balls. The chords 47 may have a length not greater than the diameter Dw of the corresponding ball, according to a ratio of chord length to ball diameter in the range from 0.7 to 0.9.

In addition to the embodiments as described above, it is to be understood that numerous other variants exist. It is also to be understood that the embodiments are provided solely by way of example and do not limit the object of the invention or its applications or its possible configurations. On the contrary, although the description given above enables those skilled in the art to implement the present invention according to at least one example of its configurations, it is to be understood that numerous variations of the components described may be envisaged without thereby departing from the object of the invention as defined in the appended claims, interpreted literally and/or according to their legal equivalents.

The invention claimed is:

1. A bearing unit comprising:
    at least one row of rolling bodies, wherein each rolling body has two poles and an equator; and
    at least one cage configured to retain the rolling bodies, the at least one cage comprising:
    at least one cage bar;
    a plurality of cage arms circumferentially spaced, which extend from one side of the cage bar; and
    a plurality of partially spherical cavities configured to retain said rolling bodies;
    wherein the rolling bodies and the at least one cage are in contact with each other according to contact surfaces positioned nearer to the poles than the equators of the rolling bodies,
    wherein the minimum number of contact surfaces for containing the rolling bodies in the direction of rotation of the bearing and ensuring contact only in the polar region, is equal to two for each rolling body comprising one upper contact surface and one lower contact surface; and wherein each of said plurality of cage arms comprises a first surface extending from the cage bar, and a second surface extending from a junction between the first surface and the second surface distally from the cage bar, wherein the second surface is inclined toward the cage bar by an angle ($\beta$) whose value is between 10° and 20° with respect to a line tangent to the junction.

2. The bearing unit according to claim 1, wherein the cage bar and the cage arms have partially spherical concave surfaces, defining together the plurality of partially spherical cavities on which the contact surfaces are formed between rolling bodies and cages.

3. The bearing unit according to claim 2, wherein an intersection volume, configured for avoiding contact between adjacent rolling bodies and defined between an outer surface of the rolling bodies and an inner surface of the cage arms of the cage is between 0.5 mm³ and 1 mm³.

4. The bearing unit according to claim 2, wherein the diameter (Ds) of a spherical surface which defines the partially spherical cavity is greater than the diameter (Dw) of the respective rolling body, inserted inside the partially spherical cavity, so as to determine a clearance variable from 0.1 mm to 0.5 mm.

5. The bearing unit according to claim 2, wherein the partially spherical cavity has chords which define lower end entry edges for the retention of the rolling bodies, said chords having a length whose ratio with respect to the diameter (Dw) of the respective rolling body ranges between 0.7 and 0.9.

6. The bearing unit according to claim 1, wherein the contact surfaces are symmetrical with respect to an equatorial plane of the rolling body.

7. The bearing unit according to claim 1, wherein the upper contact surface, with respect to the center (C) of the corresponding rolling body, extends in an outer radial direction of a first parameter value (D) not greater than 0.5 multiplied by the diameter (Dw) of the rolling body, in an inner radial direction of a second parameter value (E) not greater than 0.3 multiplied by the diameter (Dw) of the rolling body and in an axial direction of a third parameter value (F) not greater than 0.5 multiplied by the diameter (Dw) of the rolling body.

8. The bearing unit according to claim 1, wherein the lower contact surface, referred to the center (C) of the corresponding rolling body extends in the internal radial direction of a first parameter value (G) not greater than 0.41 multiplied by the diameter (Dw) of the rolling body and in the axial direction of a second parameter value (H) not greater than 0.52 multiplied by the diameter (Dw) of the rolling body.

9. A wheel hub assembly for motor vehicles comprising:
a hub; and
a bearing unit comprising:
at least one row of rolling bodies, wherein each rolling body has two poles and an equator; and
at least one cage configured to retain the rolling bodies, the at least one cage comprising:
at least one cage bar;
a plurality of cage arms circumferentially spaced, which extend from one side of the cage bar; and
a plurality of partially spherical cavities configured to retain said rolling bodies;

wherein the rolling bodies and the at least one cage are in contact with each other according to contact surfaces positioned nearer to the poles than the equators of the rolling bodies, wherein the minimum number of contact surfaces for containing the rolling bodies in the direction of rotation of the bearing and ensuring contact only in the polar region, is equal to two for each rolling body comprising one upper contact surface and one lower contact surface; and wherein each of said plurality of cage arms comprises a first surface extending from the cage bar, and a second surface extending from a junction between the first surface and the second surface distally from the cage bar, wherein said plurality of cage arms has a surface inclined by an angle ($\beta$) whose value is between 10° and 20°.

10. The wheel hub assembly according to claim 9, wherein the cage bar and the cage arms have partially spherical concave surfaces, defining together the plurality of partially spherical cavities on which the contact surfaces are formed between rolling bodies and cages.

11. The wheel hub assembly according to claim 10, wherein an intersection volume, configured for avoiding contact between adjacent rolling bodies and defined between an outer surface of the rolling bodies and an inner surface of the cage arms of the cage is between 0.5 mm³ and 1 mm³.

12. The wheel hub assembly according to claim 10, wherein the diameter (Ds) of a spherical surface which defines the partially spherical cavity is greater than the diameter (Dw) of the respective rolling body, inserted inside the partially spherical cavity, so as to determine a clearance variable from 0.1 mm to 0.5 mm.

13. The wheel hub assembly according to claim 10, wherein the partially spherical cavity has chords which define lower end entry edges for the retention of the rolling bodies, said having a length whose ratio with respect to the diameter (Dw) of the respective rolling body ranges between 0.7 and 0.9.

14. The wheel hub assembly according to claim 9, wherein the contact surfaces are symmetrical with respect to an equatorial plane of the rolling body.

15. The wheel hub assembly according to claim 9, wherein the upper contact surface, referred to the center (C) of the corresponding rolling body extends in an outer radial direction of a first parameter value (D) not greater than 0.5 multiplied by the diameter (Dw) of the rolling body, in an inner radial direction of a second parameter value (E) not greater than 0.3 multiplied by the diameter (Dw) of the rolling body and in an axial direction of a third parameter value (F) not greater than 0.5 multiplied by the diameter (Dw) of the rolling body.

16. The wheel hub assembly according to claim 9, wherein the lower contact surface, with respect to the center (C) of the corresponding rolling body, extends in the internal radial direction of a first parameter value (G) not greater than 0.41 multiplied by the diameter (Dw) of the rolling body and in the axial direction of a second parameter value (H) not greater than 0.52 multiplied by the diameter (Dw) of the rolling body.

* * * * *